United States Patent [19]

Lemley

[11] Patent Number: 5,367,930
[45] Date of Patent: Nov. 29, 1994

[54] CUTTING APPARATUS FOR PAPER BUTT ROLL RECYCLING

[76] Inventor: John H. Lemley, 2511 Mt. Carmel Rd., Covington, Tenn. 38019

[21] Appl. No.: 93,666

[22] Filed: Jul. 20, 1993

[51] Int. Cl.⁵ ............................................. B26D 5/00
[52] U.S. Cl. .................................. 83/368; 83/435.2; 83/446; 83/508.2; 83/924
[58] Field of Search ............ 83/54, 368, 425, 435.2, 83/446, 447, 449, 508.2, 881, 924, 947

[56] References Cited

U.S. PATENT DOCUMENTS

| | | |
|---|---|---|
| 1,640,090 | 8/1927 | Murray . |
| 1,838,011 | 12/1931 | St. Peter . |
| 3,245,302 | 4/1966 | Bayley ............................ 83/614 |
| 3,577,889 | 5/1971 | Eriksen ........................ 83/54 X |
| 3,605,542 | 9/1971 | Smith et al. ................... 83/564 |
| 3,888,150 | 6/1975 | Stroud et al. ................. 83/368 |
| 4,438,754 | 3/1984 | Nanny et al. ................ 83/924 X |
| 4,506,575 | 3/1985 | McCay et al. ................. 83/368 |
| 4,864,906 | 9/1989 | Hall ............................. 83/886 |
| 5,101,703 | 4/1992 | Tanaka et al. ............... 83/368 X |

*Primary Examiner*—Eugenia Jones
*Attorney, Agent, or Firm*—Walker, McKenzie & Walker

[57] ABSTRACT

A cutting apparatus for removing remnant paper from a paper butt roll. A beam-mounted saw rocks toward and away from the butt roll and cuts remnant paper from the roll's core. An arm-mounted wheel senses the thickness of remnant paper on the roll, and causes a block-and-tackle positioning mechanism to rock the beam and saw to a proper position for cutting the paper from the roll. A conveyor moves the butt rolls past the saw, and the height of the conveyor may be adjusted to accommodate various diameters of butt rolls.

8 Claims, 2 Drawing Sheets

CUTTING APPARATUS FOR PAPER BUTT ROLL RECYCLING

BACKGROUND OF THE INVENTION

1. Field of the Invention

The present invention relates, in general, to recycling apparatus, and in particular, to an apparatus for cutting the remnant paper from nearly-empty paper rolls.

2. Information Disclosure Statement

It is often desired to remove the remnant paper from nearly-empty paper rolls, i.e., so-called "butt rolls". Heretofore, various manual methods have been employed to remove the remnant paper from the rolls such as knives or hand-held circular saws that longitudinally cut the paper from the rolls, separating the cardboard cores of the rolls for reuse and the paper for subsequent recycling. Other apparatus are known that place the cardboard cores on a metal mandrel and utilize a knife that cuts through the remnant paper toward the mandrel. However, such methods are inefficient and slow, and care must be taken not to cut into the cardboard cores while cutting the remnant paper from the cores.

It is therefore desirable to have an apparatus that can cut the remnant paper from paper butt rolls with higher throughput than heretofore known, and that automatically adjusts its cutting depth to match the amount of remnant paper on each butt roll.

A preliminary patentability search in Class 83, subclasses 924, produced the following patents, some of which may be relevant to the present invention: Murray, U.S. Pat. No. 1,640,090, issued Aug. 23, 1927; St. Peter, U.S. Pat. No. 1,838,011, issued Dec. 22, 1931; Smith et al., U.S. Pat. No. 3,605,542, issued Sep. 20, 1971; Bayley, U.S. Pat. No. 3,245,302, issued Apr. 12, 1966; McCay et al., U.S. Pat. No. 4,506,575, issued Mar. 26, 1985; and Hall, U.S. Pat. No. 4,864,906, issued Sep. 12, 1989. None of these patents disclose or suggest the present invention.

SUMMARY OF THE INVENTION

The present invention is a cutting apparatus for cutting remnant paper from a so-called "paper butt roll", i.e., a nearly-empty roll of paper wound about a typically cardboard core. A beam-mounted saw having a rotating circular cutting blade moves up and down to cut the remnant paper from the core. A conveyor moves a sequence of butt rolls past the saw, while a sensing means, such as a wheel at the end of a pivoted arm, senses the thickness of remnant paper on the core and causes positioning means to move the saw up and down an appropriate amount so that the remnant paper, but not the core, is cut.

It is an object of the present invention to provide a high throughput cutting apparatus for removing remnant paper from paper butt rolls. It is a further object of the present invention to provide automatic adjustment of its cutting depth to accommodate the varying amounts of remnant paper left on successive butt rolls. Furthermore, the cutting apparatus should provide means for accommodating the various sizes of paper roll cores around which the remnant paper is wound.

DESCRIPTION OF THE PREFERRED EMBODIMENT

Figure 1:
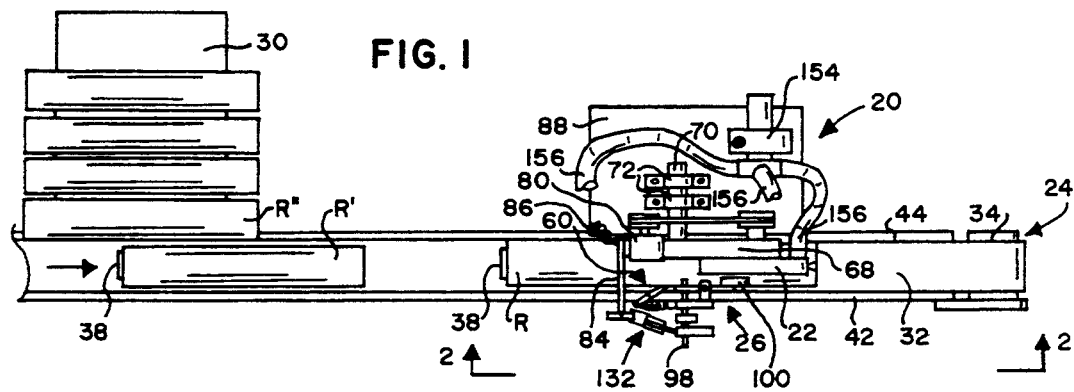
FIG. 1 is a top plan view of the present invention showing the feeding of paper butt rolls past the saw means.

Referring to FIGS. 1–6, cutting apparatus 20 is seen to comprise saw means 22 for cutting remnant paper from the core of a paper butt roll R, conveyor means 24 for moving butt roll R past saw means 22, sensing means 26 for measuring the thickness T of remnant paper wound about core C of butt roll R, and positioning means 28, responsive to sensing means 26, for positioning saw means 22 to cut a thickness T into butt roll R in a manner hereinafter described, thereby severing the remnant paper from the core C. Typically, a thickness of approximately one inch (2.5 centimeters) of remnant paper is left on a butt roll, and butt rolls are typically 36 inches (1 meter) or 44 inches (1.1 meters) in length.

As shown in FIG. 1, a well-known inclined ramp or rack 30 is provided for sequentially supplying butt rolls R', R", etc. onto conveyor means 24, for subsequent moving thereof past saw means 22. Ramp 30 is understood to be approximately six inches (15 centimeters) lower at the end adjacent conveyor means 24 than at the end remote from conveyor means 24, allowing gravity feed of butt rolls onto the conveyor. An operator merely ensures that a supply of butt rolls is kept on ramp 30. As one butt roll is dragged away from ramp 30, another butt roll falls into place for subsequent conveyance towards and past saw means 22. After saw means 22 has cut the remnant paper from the butt roll R, the roll and cut paper are moved on by conveyor means 24 to an operator (not shown) who stacks the cut paper onto pallets for subsequent banding and shipment to paper mills for recycling.

Conveyor means 24 includes a well-known continuous conveyor belt 32 driven by a motor 34, as by a well-known belt-and-pulley drive arrangement 36 as shown, and has a spaced plurality of right-angled or "L-shaped" brackets 38 attached thereto for pushing against the trailing edge of each butt roll and urging the butt roll past saw means 22 even during the substantial resistance that occurs as saw means 22 cuts into the butt roll. Preferably, motor 34 is selected to turn its six inch (15 centimeter) pulley at 35 revolutions per minute (RPM), driving a 7.75 inch (20 centimeter) pulley 37 that moves belt 32. A plurality of well-known bearing-mounted rollers 40, shown in FIG. 5, supports conveyor belt 32, with rollers 40 preferably being secured for rotation between the sides 42 and 44 of conveyor means 24. Preferably, conveyor belt 32 spans the entire eight-inch (20 centimeter) distance between sides 42 and 44.

Figure 5:
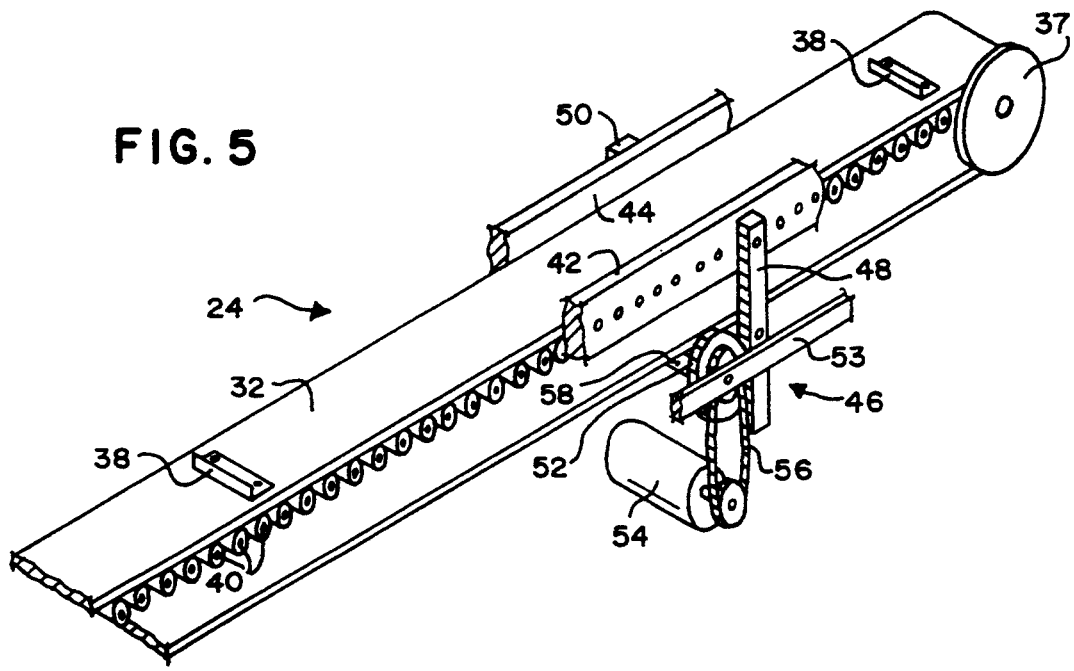
FIG. 5 is a partial perspective view of the conveyor means, with some parts removed for clarity.

As shown in FIG. 5, conveyor means 24 preferably includes adjustment means 46 for raising and lowering conveyor means 24 with respect to saw means 22 so that the bottom of the butt rolls can be at a predetermined first height, with this predetermined first height being a function of the core outer diameter of a group of paper butt rolls to be processed, all in a manner hereinafter described. Adjustment means 46 preferably includes racks 48 and 50 respectively secured to sides 42 and 44 of conveyor means 24, and also includes a pinion gear 52 meshingly engaged with each rack as shown and rotatably mounted to the support frame 53 for conveyor means 24. It shall be understood that, although only one side of adjustment means 46 is shown, it shall be understood that the other side including rack 50 is similar, and a description and view of one side shall suffice for both. Adjustment means 46 further comprises a motor 54, drivingly coupled to gear 52 as by a chain 56, and it shall be understood that axle 58 causes the pinion gear (not shown) that engages rack 50 to be turned in concert with gear 52, in a manner well-known to those skilled in the art. It can be seen that, as motor 54 turns gear 52, rack 50 is caused to move upwardly and downwardly, thereby raising and lowering conveyor means 24.

Figure 2:
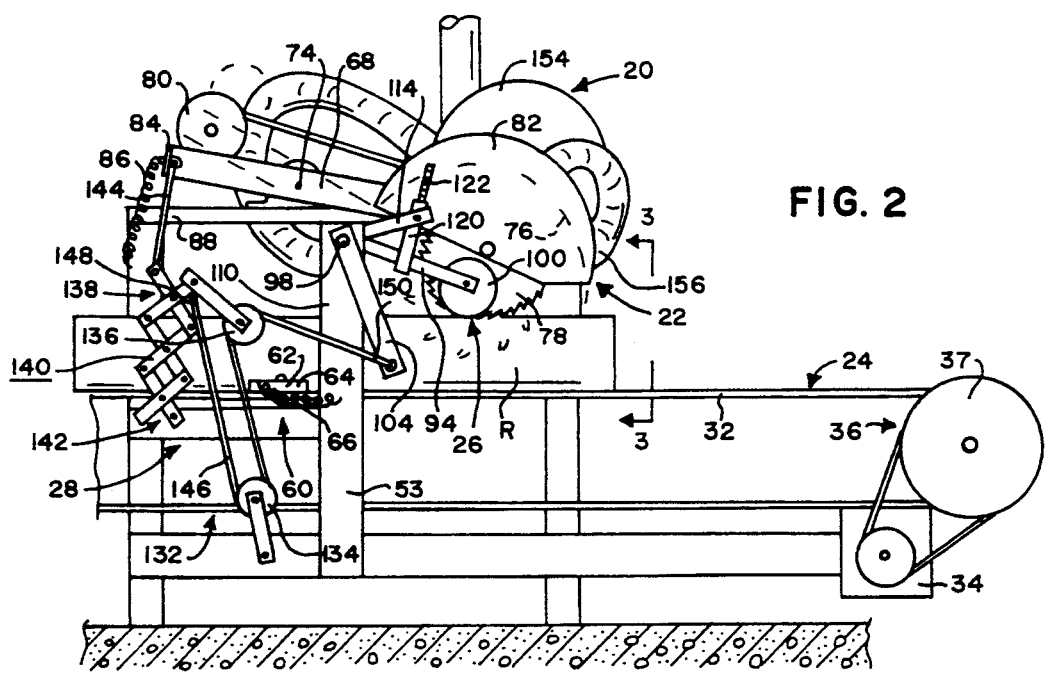
FIG. 2 is a front side view of the present invention, taken substantially along the line 2—2 shown in FIG. 1 and somewhat enlarged.
Figure 3:
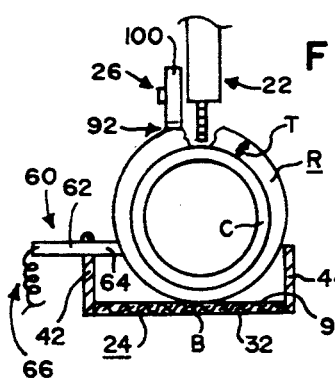
FIG. 3 is an end view of the present invention showing the saw means cutting the remnant paper and the wheel means contacting a top portion of a butt roll, taken substantially along the line 3—3 shown in FIG. 2.

Conveyor means 24 also preferably includes alignment means 60 (see FIGS. 1–3) for longitudinally aligning butt rolls R along their direction of travel as they pass saw means 22. In the preferred embodiment, alignment means 60 is a bar 62 pivotally mounted to conveyor means 24 for pivotal movement of one end 64 of bar 62 toward and away from butt roll R as butt roll R passes saw means 22. Alignment means 60 further includes spring biasing means 66 for causing end 64 of pivoted bar 62 to forcingly urge butt roll R against side 44 of conveyor means 24 as shown in FIG. 3, thereby correctly aligning butt roll R beneath saw means 22 for cutting of the remnant paper. Spring biasing means 66 preferably has one end anchored to the support frame 53 of conveyor means 24, and has its other end anchored to bar 62 as shown, thereby causing a restoring force to bias end 64 of bar 62 against butt roll R in a manner that will now be understood.

Figure 6:
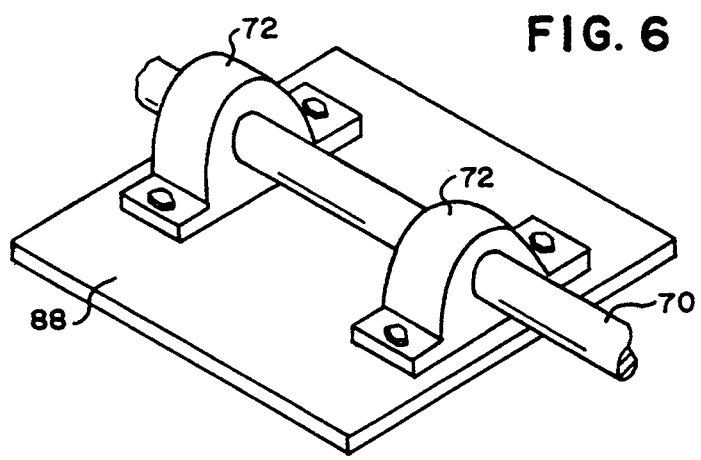
FIG. 6 is a perspective view of the pillow block bearings of the present invention.

Cutting apparatus 20 further comprises a beam 68 mounted for rocking pivotal movement alongside conveyor means 24. It will be understood that beam 68 is secured to a rearwardly-extending axle 70 in a manner well-known to those skilled in the art, with axle 70 being supported by so-called well-known "pillow block" bearings 72 as shown in FIGS. 1 and 6, thereby allowing beam 68 to pivotally rock about an axis 74 shown in FIG. 2.

Saw means 22 is mounted to beam 68 a radial distance from the pivotal mounting of beam 68, thereby causing saw means 22 to move upwardly and downwardly with respect to conveyor means 24 as beam 68 is caused to rock by means hereinafter described. FIG. 2 shows, in dotted outline, a somewhat exaggerated rocking position 76 of saw means 22 and beam 68 in which saw means 22 is moved downwardly toward conveyor means 24.

Saw means 22 preferably includes a well-known rotatable circular toothed blade 78, mounted to beam 68 for rotation with respect thereto, and a motor means 80 for rotating circular blade 78 in a manner well-known to those skilled in the art as by pulleys and belts coupling motor means 80 to blade 78. Preferably, saw means 22 includes a protective guard 82 enclosing exposed portions of blade 78 for safety. Motor means 80 and saw means 22 are mounted to beam 68 so as to almost balance one another, in a manner well-known to those skilled in the art, with a slight off-balance being present so as to cause saw means 22 to be urged downwardly by gravity. In the preferred embodiment, motor means 80 is offset approximately ten inches (25 centimeters) from axis 74 and saw means 22 is offset approximately 15 inches (38 centimeters) from axis 74. The relatively shorter ten-inch length of that portion of beam 68 on which motor means 80 is mounted is preferred so that larger butt rolls can pass below extension arm 84 that extends over conveyor means 24 from beam 68 for reasons hereinafter explained. As beam 68 rocks, extension arm 84 will approach conveyor means 24, thereby approaching the butt rolls passing therepast. By having a relatively short distance from axis 74 to extension arm 84, extension arm 84 is caused to not approach the passing butt rolls as closely as it otherwise might as beam 68 rocks, thereby allowing larger butt rolls to pass. If necessary, a counterbalance spring means 86 may be provided between support table 88 that supports saw means 22 and beam 68 for applying a biasing force to beam 68 to cause saw means 22 to rise.

Figure 4:
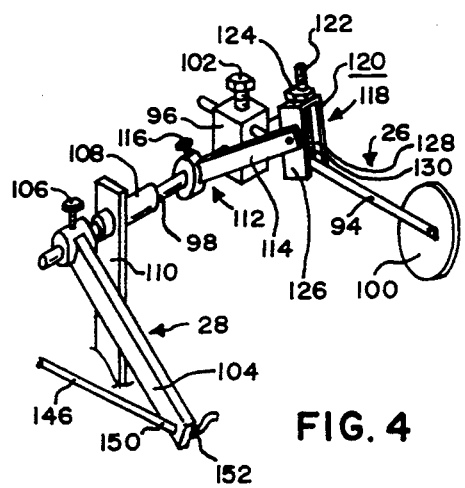
FIG. 4 is a perspective view of the wheel means and a portion of the positioning means of the present invention.

As shown in FIGS. 2–4, cutting apparatus 20 includes sensing means 26 for measuring the thickness T of remnant paper on the butt roll. In the preferred embodiment, conveyor means 24 moves butt roll R past saw means 22 such that the bottom B of butt roll R remains at a predetermined first height $h_1$ for a predetermined given core outer diameter. In other words, the bottom of the butt roll rests on the upper surface 90 of conveyor belt 32, thereby defining this first height $h_1$ as the height of upper surface 90 above the floor. By examination of FIG. 3, it will be understood that the top portion 92 of butt roll R is at a second height $h_2$ such that:

$$h_2 = h_1 + d_c + 2T$$

where $d_c$ is the outer diameter of core C. For a given group of butt rolls R having the same core size, $h_2$ will be seen to be incrementally proportional to twice the remnant paper thickness T. In the preferred embodiment of the present invention, the interaction of sensing means 26 and positioning means 28 is such that saw means 22 is caused to move vertically an incremental distance of T above a nominal height of $h_1 + d_c$ for each incremental movement 2T of sensing means 26 above its nominal position of $h_1 + d_c$, thereby causing saw means 22 to cut a single thickness T into butt roll R as shown in FIG. 3. Of course, it shall be understood that this discussion of "height" and "top portions" is for purposes of explanation only, as an equivalent embodiment of the present invention could have sensing means 26 equivalently sense the "width" of a "side portion" of butt roll R as long as the side of butt roll R remote from sensing means 26 is constrained to be at a fixed location, analogous to the fixed location of bottom B of butt roll R. It is, however, desirable in all embodiments of the present invention that sensing means 26 contact roll R in substantially the same plane transverse to the movement of butt roll R as does saw means 22 so that saw means 22 can appropriately track the thickness T of remnant paper on the butt rolls, especially at the leading and trailing edges of the butt rolls.

In the preferred embodiment, as seen in FIGS. 2–4, sensing means 26 comprises a first arm 94 pivoted about an axis, as by block 96 freely pivotable upon axle 98, and wheel means 100, secured to arm 94 for rotation with respect thereto, for rollingly contacting top portion 92 of butt roll R. It shall be understood that the point of contact of wheel means 100 with butt roll R corresponds to height $h_2$ as defined above. As shown in FIG. 4, arm 94 is adjustably secured to block 96 as by passing through a bore through block 96 and secured therewithin in a manner well-known to those skilled in the art as by a set screw or bolt 102.

Furthermore, positioning means 28 is seen to comprise a second arm 104 preferably pivoted about the same axis as first arm 94, with second arm 104 being secured to axle 98 for simultaneous movement therewith by a set screw or bolt 106. Axle 98 is understood to be supported for rotation in a manner well-known to those skilled in the art, as by a bearing 108 through support 110 extending upwardly from support frame 53 of conveyor means 24.

Positioning means 28 further includes interconnection means 112 for causing second arm 104 to pivot about its axis in response to pivotal movement of first arm 94. In the preferred embodiment, interconnection means 112 comprises a third arm 114 secured to axle 98 as by a set screw or bolt 116 for simultaneous movement with axle 98 and arm 104, and also comprises an adjustable linkage means 118 for coupling arm 114 to arm 94. Linkage means 118 is seen to include a downwardly opening "U-shaped" bracket or guide 120 secured to arm 114, and a threaded adjustment rod 122 threadedly inserted into bracket 120 and secured as by a locknut 124, with rod 122 extending into the region between sides 126 and 128 of bracket 120 as shown. Arm 94 is understood to be entrapped by sides 126 and 128 of bracket 120, and rests against the lower end 130 of rod 122. In this manner, by adjusting the depth to which rod 122 is threaded into bracket 120, the angle between arm 94 and arm 104 can be adjusted, it being understood that because of the coupling, in a manner hereinafter described, of positioning means 28 to beam 68 and the slight imbalance of saw means 22 on beam 68, the lower end 130 of rod 122 will be constantly urged against arm 94, thereby effectively preventing rotation of block 96 with respect to axle 98 even though block 96 is not fixedly secured to axle 98.

Positioning means 28 further comprises block and tackle means 132 operably connected between second arm 104 and beam 68, for pivotally moving or rocking beam 68 in response to pivotal movement of second arm 104. Block and tackle means 132 is seen to comprise a first pulley 134 and a second pulley 136, first pulley 134 being anchored to frame 53 of conveyor means 24 and second pulley 136 being anchored to the movable end 138 of a so-called "lazy-tong" mechanism 140. The fixed end 142 of lazy-tong mechanism 140 is anchored to frame 53, and a rod or cable 144 connects movable end 138 of lazy-tong mechanism 140 to extension arm 84 which, in turn, extends from and is secured to, beam 68. It will now be understood that extension arm 84 extends over conveyor means 24 so that positioning means 28 may connect to beam 68. As shown, a rope or cable 146 completes the block and tackle arrangement by having one end 148 secured to movable end 138 of lazy-tong mechanism 140, then passing around first pulley 134, then around second pulley 136, with the other end 150 of cable 146 being secured as by a knot 152 to arm 104.

Block and tackle means 132, connected as shown, is understood to cause movement of movable end 138 of lazy-tong mechanism 140 for a distance that is one-half the distance moved by end 150 of cable 146. Additionally, block and tackle means 132 makes it easier for sensing means 26 to move the weight and inertial of saw means 22 on beam 68. Although the various lengths of arms 104 and 94, appropriate for the actual distances of saw means 22 and extension arm 84 from axis 74, may be calculated, these lengths may also be empirically determined. The essential invariant to be preserved, however, is that saw means 22 move an incremental vertical distance of one-half the vertical distance traveled by sensing means 26 because, as previously explained, saw means 22 needs to cut a single thickness T of remnant paper into butt roll R, despite the detection by sensing means 26 of an incremental distance of 2T, as can be seen by inspection of FIG. 3.

It will now be understood that positioning means 28 causes saw means 22 to move an incremental vertical distance equal to one-half the difference between second height $h_2$ of top portion 92 minus the sum of first height $h_1$ of the bottom B of butt roll R plus outer core diameter $d_c$.

However, although a batch of butt rolls R will have a substantially similar outer core diameter $d_c$, successive batches of butt rolls may not have the same outer diameter. Two adjustment mechanisms are provided to accommodate this variation. For slight variations of core diameters, threaded rod 122 can be screwed into and out of bracket 120, thereby changing the angle between arm 94 and arm 104 and consequently adjusting the nominal reference point from which incremental thicknesses T are measured. For greater variations of core diameters, conveyor means 24 can be raised and lowered, in a manner previously described, by actuation of conveyor height adjustment means 46. In this manner, conveyor means 24 may be raised and lowered so that the bottom B of butt roll R passes saw means 22 at a different predetermined first height $h_1'$ appropriate for the different predetermined core outer diameter $d_c'$.

Preferably, positioning means 28 will also include means for limiting the downward movement of saw means 22, such as a stop (not shown) extending from support 110 and contacting arm 104 so as to limit the clockwise movement of arm 104 in a manner well-known to those skilled in the art, thereby preventing saw means 22 from crashing down onto conveyor belt 32, and preferably constraining saw means 22 from moving below a height $d_c$ above conveyor belt 32.

An exhaust fan 154 is also preferably provided for vacuuming paper dust through ducts 156 away from saw means 22 during operation and out to a paper dust collection point in a manner well-known to those skilled in the art.

In practice, conveyor means 24 will be raised to the appropriate height for the butt roll cores' outer diameters, then further adjustments will be made, if needed, using adjustable linkage means 118. Arm 94 will be reciprocatingly adjusted so that wheel means 100 contacts the upper portion 92 of butt roll R in the same transverse plane as does saw means 22, and screw 102 will secure arm 94 in this position. Conveyor means 24 will be started, butt rolls will be fed past saw means 22, and remnant paper will be cut from the rolls.

Although the present invention has been described and illustrated with respect to a preferred embodiment and a preferred use therefor, it is not to be so limited since modifications and changes can be made therein which are within the full intended scope of the invention.

I claim:

1. A cutting apparatus for cutting remnant paper from a paper butt roll, said butt roll comprising a core and a thickness of said remnant paper wound about said core, said cutting apparatus comprising:
- (a) saw means for cutting said remnant paper from said core;
- (b) conveyor means for moving said butt roll past said saw means;
- (c) sensing means for measuring said thickness of said remnant paper; and
- (d) positioning means, responsive to said sensing means, for positioning said saw means to cut said thickness into said butt roll.

2. The cutting apparatus as recited in claim 1, in which said saw means includes a rotatable circular toothed blade, and said cutting apparatus further comprises motor means for rotating said circular toothed blade.

3. The cutting apparatus as recited in claim 1, in which said conveyor means moves said butt roll past said saw means such that a bottom of said butt roll remains at a predetermined first height for a predetermined core outer diameter; in which said sensing means measures said thickness of said remnant paper by sensing a second height of a top portion of said butt roll above said first height, and in which said positioning means causes said saw means to move an incremental vertical distance equal to one-half the difference of
said second height
minus
said first height plus said core outer diameter.

4. The cutting apparatus as recited in claim 3, in which said conveyor means includes alignment means for longitudinally aligning said butt rolls along their direction of travel as they pass said saw means.

5. The cutting apparatus as recited in claim 4, in which said alignment means includes a bar pivoted for movement of one end thereof toward and away from said butt rolls as they pass said saw means, and in which said alignment means further includes spring biasing means for causing said one end of said pivoted bar to forcingly urge said butt rolls against a side of said conveyor means.

6. The cutting apparatus as recited in claim 3, in which said conveyor means includes adjustment means for raising and lowering said conveyor means so that the bottom of said butt roll remains at a different said predetermined first height for different said predetermined core outer diameters.

7. The cutting apparatus as recited in claim 3, in which said cutting apparatus further comprises a beam pivotally mounted for movement about a first axis, and said saw means is mounted to said beam a radial distance from said first axis of said beam; in which said sensing means comprises:
- (a) a first arm pivoted about a second axis; and
- (b) wheel means, secured to said first arm for rotation with respect thereto, for rollingly contacting said top portion of said butt roll, with the point of contact of said wheel means with said top portion of said butt roll defining said second height;

and in which said positioning means comprises:
- (c) a second arm pivoted about said second axis;
- (d) interconnection means for causing said second arm to pivot about said second axis in response to pivotal movement of said first arm about said second axis; and
- (e) block and tackle means, operably connected between said second arm and said beam, for pivotally moving said beam in response to pivotal movement of said second arm.

8. A cutting apparatus for cutting remnant paper from a paper butt roll, said butt roll comprising a core and a thickness of said remnant paper wound about said core, said cutting apparatus comprising:
- (a) a beam pivotally mounted for movement about a first axis;
- (b) saw means, mounted to said beam a radial distance from said first axis of said beam, for cutting said remnant paper from said core;
- (c) conveyor means for moving said butt roll past said saw means such that a bottom of said butt roll remains at a predetermined first height for a predetermined core outer diameter;
- (d) sensing means for measuring said thickness of said remnant paper by sensing a second height of a top portion of said butt roll above said first height, said sensing means comprising:
  - i. a first arm pivoted about a second axis; and
  - ii. wheel means, secured to said first arm for rotation with respect thereto, for rollingly contacting said top portion of said butt roll, with the point of contact of said wheel means with said top portion of said butt roll defining said second height; and
- (e) positioning means, responsive to said sensing means, for positioning said saw means to cut said thickness into said butt roll by causing said saw means to move an incremental vertical distance equal to one-half the difference of
said second height
minus
said first height plus said core outer diameter;
said positioning means comprising:
  - i. a second arm pivoted about said second axis;
  - ii. interconnection means for causing said second arm to pivot about said second axis in response to pivotal movement of said first arm about said second axis; and
  - iii. block and tackle means, operably connected between said second arm and said beam, for pivotally moving said beam in response to pivotal movement of said second arm;
said conveyor means including adjustment means for raising and lowering said conveyor means so that the bottom of said butt roll remains at a different said predetermined first height for different said predetermined core outer diameters.

* * * * *